(12) United States Patent
Wang et al.

(10) Patent No.: US 12,273,739 B2
(45) Date of Patent: Apr. 8, 2025

(54) COMMUNICATION METHOD AND APPARATUS FOR CONFIGURING A BANDWIDTH PART

(71) Applicant: HUAWEI TECHNOLOGIES CO., LTD., Guangdong (CN)

(72) Inventors: Yu Wang, Hangzhou (CN); Hejia Luo, Hangzhou (CN); Xiaolu Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 371 days.

(21) Appl. No.: 17/736,447

(22) Filed: May 4, 2022

(65) Prior Publication Data

US 2022/0264325 A1   Aug. 18, 2022

Related U.S. Application Data

(63) Continuation of application No. PCT/CN2020/118407, filed on Sep. 28, 2020.

(30) Foreign Application Priority Data

Nov. 7, 2019   (CN) .......................... 201911081538.9

(51) Int. Cl.
*H04W 16/28*   (2009.01)
*H04W 72/044*   (2023.01)
(Continued)

(52) U.S. Cl.
CPC ......... *H04W 16/28* (2013.01); *H04W 72/044* (2013.01); *H04W 72/0453* (2013.01); *H04W 72/23* (2023.01); *H04W 74/0866* (2013.01)

(58) Field of Classification Search
CPC ... H04W 16/28; H04W 72/23; H04W 72/044; H04W 72/0453; H04W 74/0866
See application file for complete search history.

(56) References Cited

U.S. PATENT DOCUMENTS 11,456,796 B2 * 9/2022 Awad ................ H04W 72/0453
2019/0149380 A1   5/2019 Babaei et al.
(Continued)

FOREIGN PATENT DOCUMENTS

CN   101356789 A   1/2009
CN   109586878 A   4/2019
(Continued)

OTHER PUBLICATIONS

Nokia et al., "Differences of BWP configuration options 1 and 2," 3GPP TSG-RAN WG2 Meeting #103, R2-1811372, Gothenburg, Sweden, Aug. 20-24, 2018, 8 pages.
(Continued)

*Primary Examiner* — Chandrahas B Patel
(74) *Attorney, Agent, or Firm* — Fish & Richardson P.C.

(57) ABSTRACT

The present disclosure relates to communication methods and apparatuses. In one example method, a terminal device receives first information from an access device, and determines a first bandwidth part (BWP) of an access beam of the terminal device based on the received first information and a second BWP configured for the access beam of the terminal device. Then, the terminal device communicates with the access device in the determined first BWP by using the access beam. The first information indicates a relationship between the first BWP and the second BWP. The second BWP is a dedicated BWP configured for the access beam of the terminal device.

20 Claims, 11 Drawing Sheets

(51) Int. Cl.
*H04W 72/0453* (2023.01)
*H04W 72/23* (2023.01)
*H04W 74/08* (2024.01)

(56) References Cited

U.S. PATENT DOCUMENTS

| | | | |
|---|---|---|---|
| 2019/0313348 A1 | 10/2019 | Molavianjazi et al. | |
| 2021/0051575 A1* | 2/2021 | Yang | H04W 48/12 |
| 2021/0105127 A1* | 4/2021 | Tang | H04W 72/23 |
| 2021/0392532 A1* | 12/2021 | Wu | H04W 24/08 |

FOREIGN PATENT DOCUMENTS

| | | | |
|---|---|---|---|
| CN | 109644099 A | 4/2019 |
| CN | 109803407 A | 5/2019 |
| CN | 109803443 A | 5/2019 |
| CN | 110366261 A | 10/2019 |
| WO | 2009072087 A1 | 6/2009 |
| WO | 2019047974 A1 | 3/2019 |
| WO | 2019137288 A1 | 7/2019 |
| WO | 2019157720 A1 | 8/2019 |

OTHER PUBLICATIONS

Office Action issued in Chinese Application No. 201911081538.9 on Jan. 6, 2022, 14 pages (with English translation).
PCT International Search Report and Written Opinion issued in International Application No. PCT/CN2020/118407 on Dec. 9, 2020, 17 pages (with English translation).
Qualcomm Incorporated, "Clarification for initial BWP ID configuration for DCI indication," 3GPP TSG-RAN WG2 Meeting #101, R2-1803022, Athens, Greece, Feb. 26-Mar. 2, 2018, 4 pages.
Qualcomm Incorporated, "Remaining Issues on BWP," 3GPP TSG RAN WG1 Meeting #92, R1-1802844, Athens, Greece, Feb. 26-Mar. 2, 2018, 24 pages.
Samsung, "RLM/RLF for bandwidth part," 3GPP TSG-RAN WG2 #99bis, R2-1711404, Prague, Czech, Oct. 9-13, 2017, 3 pages.
Asia Pacific Telecom, "Discussion on Physical Layer Control Procedures for NTN," 3GPP TSG-RAN WG1 Meeting #98, R1-1908934, Prague, Czech Republic, Aug. 26-30, 2019, 6 pages.
Panasonic, "On Physical Layer Control Procedures for NTN," 3GPP TSG RAN WG1 #98bis, R1-1911003, Chongqing, China, Oct. 14-20, 2019, 4 pages.
Extended European Search Report in European Appln No. 20883920.9, dated Oct. 20, 2022, 10 pages.

* cited by examiner

COMMUNICATION METHOD AND APPARATUS FOR CONFIGURING A BANDWIDTH PART

CROSS-REFERENCE TO RELATED APPLICATIONS

This application is a continuation of International Application No. PCT/CN2020/118407, filed on Sep. 28, 2020, which claims priority to Chinese Patent Application No. 201911081538.9, filed on Nov. 7, 2019. The disclosures of the aforementioned applications are hereby incorporated by reference in their entireties.

TECHNICAL FIELD

Embodiments of this application relate to the communication field, and in particular, to a communication method and apparatus.

BACKGROUND

A next generation wireless communication system is formed by integrating heterogeneous networks of a plurality of radio access technologies (for example, a 5th generation mobile network (5G), a non-terrestrial network (NTN), and a satellite network).

To increase a system capacity, a base station (including a satellite base station and a terrestrial base station) is equipped with a large-scale antenna array system, and a plurality of beams are simultaneously formed (for example, a Viasat-3 satellite includes more than 1000 beams), to provide transmission for different users. In a multi-beam satellite communication system, frequency and polarization are usually reused between satellite beams to suppress inter-beam interference.

Currently, a communication system supports a configurable bandwidth. An access device may indicate, by using signaling, a bandwidth part (BWP) to which a terminal device belongs (the BWP is a subset of a system bandwidth), and indicate a receive bandwidth and a transmit bandwidth (which do not need to be the same as the system bandwidth) of the terminal device. The BWP is classified into an initial BWP and a dedicated BWP. The initial BWP is used to transmit system broadcast messages, obtain random access resource configuration, and initiate random access. The dedicated BWP is mainly used to transmit data services.

A standard protocol defines a quantity and a specific resource location of dedicated BWPs supported by a single cell. When a number of beams configured in the cell is greater than the number of the dedicated BWPs, a plurality of beams share the dedicated BWP. However, because services are unevenly distributed in the beams, a waste of communication resources is caused.

SUMMARY

This application provides a communication method and apparatus, to flexibly configure a BWP of a beam and save communication resources.

To achieve the foregoing objective, the following technical solutions are used in this application.

According to a first aspect, a communication method is provided. The method may be applied to a terminal device. The communication method may include: The terminal device receives first information from an access device, and the terminal device determines a first BWP of an access beam of the terminal device based on the received first information and a second BWP configured for the access beam of the terminal device. Then, the terminal device communicates with the access device in the determined first BWP by using the access beam. The first information indicates a relative amount between the first BWP and the second BWP. The second BWP is a dedicated BWP configured for the access beam of the terminal device.

According to the communication method provided in this application, the first BWP of the access beam of the terminal device may be configured based on a communication requirement of the terminal device, and a relative amount between the first BWP and the second BWP is indicated by using the first information, to flexibly configure a BWP of a beam. A BWP of the access beam of the terminal device is configured based on an actual communication requirement, and the BWP replaces a fixed dedicated BWP using existing configuration. Therefore, even if a service volume of the terminal device is small, not all resources of the dedicated BWP are occupied. This effectively saves communication resources.

The first BWP may be a portion or all of the second BWP. The first BWP and the second BWP may be the same or different.

With reference to the first aspect, in a possible implementation, the first information may include one or more of the following information: a scaling factor, a frequency offset, or a beam number. The scaling factor is a ratio of a bandwidth of the first BWP to a bandwidth of the second BWP. The frequency offset is an offset of a base frequency of the first BWP relative to a reference frequency in frequency domain of the second BWP, the base frequency may be any frequency in frequency domain of the first BWP, and the reference frequency may be any frequency in the frequency domain of the second BWP. The beam number is indicated by one or more beam numbers associated with the BWPs. In this implementation, the bandwidth of the first BWP is indicated by using the scaling factor, and a frequency domain location of the first BWP is indicated by using the frequency offset, to indicate a specific location of the first BWP by using the first information.

With reference to the first aspect or any one of the foregoing possible implementations, in another possible implementation, the base frequency may be a start frequency of the frequency domain of the first BWP, a center frequency of the frequency domain of the first BWP, or an end frequency of the frequency domain of the first BWP.

With reference to the first aspect or any one of the foregoing possible implementations, in another possible implementation, the reference frequency may be a start frequency of the frequency domain of the second BWP, a center frequency of the frequency domain of the second BWP, or an end frequency of the frequency domain of the second BWP.

With reference to the first aspect or any one of the foregoing possible implementations, in another possible implementation, the frequency offset may be a positive or negative number.

With reference to the first aspect or any one of the foregoing possible implementations, in another possible implementation, the communication method provided in this application may further include: The terminal device receives, from the access device, location information of a dedicated BWP that is supported by a communication system and that is accessed by the terminal device. The location information indicates a time-frequency resource location of the dedicated BWP. A quantity of dedicated BWPs supported by the communication system may be any one of the following: 4, 8, 16, 32, or 64.

Correspondingly, that the terminal device determines the first BWP based on the first information and the second BWP may be implemented as follows: The terminal device determines the first BWP based on the first information and location information of the second BWP.

With reference to the first aspect or any one of the foregoing possible implementations, in another possible implementation, the communication method provided in this application may further include: The terminal device receives indication information from the access device. The indication information may indicate a polarization manner in which the terminal device communicates on the access beam of the terminal device. The polarization manner is indicated, to improve solution diversity.

Correspondingly, that the terminal device communicates with the access device in the first BWP by using the access beam of the terminal device may be implemented as follows: The terminal device communicates with the access device in the first BWP by using the access beam of the terminal device in the polarization manner indicated by the indication information.

With reference to the first aspect or any one of the foregoing possible implementations, in another possible implementation, the polarization manner may include right hand circular polarization (RHCP) or left hand circular polarization (LHCP).

With reference to the first aspect or any one of the foregoing possible implementations, in another possible implementation, the indication information may be the first information, or the indication information may be information other than the first information.

With reference to the first aspect or any one of the foregoing possible implementations, in another possible implementation, the first information and/or the indication information may be carried in a radio resource control (RRC) message.

With reference to the first aspect or any one of the foregoing possible implementations, in another possible implementation, the communication method provided in this application may further include: The terminal device receives second information. The second information indicates a first resource for random access performed by the terminal device. The terminal device determines the first resource based on the second information. The terminal device performs random access by using the first resource.

With reference to the first aspect or any one of the foregoing possible implementations, in another possible implementation, the first resource may be located outside a time-frequency resource of an initial BWP. A random access resource of the terminal device is configured outside the initial BWP, to prevent terminal devices of all beams from performing random access in the initial BWP. This reduces a random access delay, and improves a network access capacity.

With reference to the first aspect or any one of the foregoing possible implementations, in another possible implementation, the second information may include time domain location information and frequency domain location information of the first resource; or a relative amount between the first resource and a random access resource in the initial BWP.

With reference to the first aspect or any one of the foregoing possible implementations, in another possible implementation, the relative amount between the first resource and the random access resource in the initial BWP may include a time domain relative amount and/or a frequency domain relative amount.

With reference to the first aspect or any one of the foregoing possible implementations, in another possible implementation, the second information may be carried in a system information block (SIB) 1 message.

According to a second aspect, another communication method is provided. The method may be applied to an access device. The communication method may include: The access device determines a first BWP of an access beam of a terminal device. The access device sends first information to the terminal device. The first information indicates a relative amount between the first BWP and a second BWP. The second BWP is a dedicated BWP configured for the access beam of the terminal device. The access device communicates with the terminal device in the first BWP by using the access beam of the terminal device.

According to the communication method provided in this application, the first BWP of the access beam of the terminal device may be configured based on a communication requirement of the terminal device, and a relative amount between the first BWP and the second BWP is indicated by using the first information, to flexibly configure a BWP of a beam. A BWP of the access beam of the terminal device is configured based on an actual communication requirement, and the BWP replaces a fixed dedicated BWP using existing configuration. Therefore, even if a service volume of the terminal device is small, not all resources of the dedicated BWP are occupied. This effectively saves communication resources.

With reference to the second aspect, in a possible implementation, the first information may include one or more of the following information: a scaling factor, a frequency offset, or a beam number. The scaling factor is a ratio of a bandwidth of the first BWP to a bandwidth of the second BWP. The frequency offset is an offset of a base frequency of the first BWP relative to a reference frequency in frequency domain of the second BWP, the base frequency may be any frequency in frequency domain of the first BWP, and the reference frequency may be any frequency in the frequency domain of the second BWP. The beam number is indicated by one or more beam numbers associated with the BWPs. In this implementation, the bandwidth of the first BWP is indicated by using the scaling factor, and a frequency domain location of the first BWP is indicated by using the frequency offset, to indicate a specific location of the first BWP by using the first information.

With reference to the second aspect or any one of the foregoing possible implementations, in another possible implementation, the communication method provided in this application may further include: The access device sends to the terminal device, location information of a dedicated BWP that is supported by a communication system and that is accessed by the terminal device. The location information of the dedicated BWP indicates a time-frequency resource location of the dedicated BWP. A quantity of dedicated BWPs supported by the communication system may be any one of the following: 4, 8, 16, 32, or 64.

With reference to the second aspect or any one of the foregoing possible implementations, in another possible implementation, the communication method provided in this application may further include: The access device sends indication information to the terminal device. The indication information may indicate a polarization manner for communicating on the beam. The polarization manner is indicated, to improve solution diversity.

Correspondingly, that the access device communicates with the terminal device in the first BWP by using the access beam of the terminal device may be implemented as follows: The access device communicates with the terminal device in the first BWP by using the access beam of the terminal device in the polarization manner indicated by the indication information.

With reference to the second aspect or any one of the foregoing possible implementations, in another possible implementation, the communication method provided in this application may further include: The access device determines a first resource for random access performed by the terminal device. The access device sends second information to the terminal device. The second information indicates the first resource. The access device performs random access to the terminal device by using the first resource.

With reference to the second aspect or any one of the foregoing possible implementations, in another possible implementation, the first resource may be located outside a time-frequency resource of an initial BWP. A random access resource of the terminal device is configured outside the initial BWP, to prevent terminal devices of all beams from performing random access in the initial BWP. This reduces a random access delay, and improves a network access capacity.

With reference to the second aspect or any one of the foregoing possible implementations, in another possible implementation, the second information may include time domain location information and frequency domain location information of the first resource; or a relative amount between the first resource and a random access resource in the initial BWP.

With reference to the second aspect or any one of the foregoing possible implementations, in another possible implementation, the relative amount between the first resource and the random access resource in the initial BWP may include a time domain relative amount and/or a frequency domain relative amount.

It should be noted that the communication method provided in the second aspect of this application and the communication method provided in the first aspect are descriptions from different perspectives of a same technical solution. For specific implementations, reference may be made to each other.

According to a third aspect, a communication method is provided. The method may be applied to a terminal device. The communication method may include: The terminal device receives second information. The second information indicates a first resource for random access performed by the terminal device, and the first resource is located outside a time-frequency resource of an initial BWP. The terminal device determines the first resource based on the second information. The terminal device performs random access by using the first resource.

According to the communication method provided by this application, a random access resource of the terminal device is configured outside the initial BWP, to prevent terminal devices of all beams from performing random access in the initial BWP. This reduces a random access delay, and improves a network access capacity.

With reference to the third aspect or any one of the foregoing possible implementations, in another possible implementation, the second information may include time domain location information and frequency domain location information of the first resource; or a relative amount between the first resource and a random access resource in the initial BWP.

With reference to the third aspect or any one of the foregoing possible implementations, in another possible implementation, the relative amount between the first resource and the random access resource in the initial BWP may include a time domain relative amount and/or a frequency domain relative amount.

With reference to the third aspect or any one of the foregoing possible implementations, in another possible implementation, the second information may be carried in a SIB1 message.

With reference to the third aspect or any one of the foregoing possible implementations, in another possible implementation, the communication method provided in this application may further include: The terminal device receives indication information from an access device. The indication information may indicate a polarization manner in which the terminal device communicates on the access beam of the terminal device. The terminal device communicates with the access device by using the access beam of the terminal device in the polarization manner indicated by the indication information. The polarization manner is indicated, to improve solution diversity.

With reference to the third aspect or any one of the foregoing possible implementations, in another possible implementation, the polarization manner may include RHCP or LHCP.

According to a fourth aspect, another communication method is provided. The method may be applied to an access device. The communication method may include: The access device determines a first resource for random access performed by a terminal device. The access device sends second information to the terminal device. The second information indicates the first resource. The access device performs random access to the terminal device by using the first resource.

According to the communication method provided by this application, a random access resource of the terminal device is configured outside an initial BWP, to prevent terminal devices of all beams from performing random access in the initial BWP. This reduces a random access delay, and improves a network access capacity.

With reference to the fourth aspect or any one of the foregoing possible implementations, in another possible implementation, the second information may include time domain location information and frequency domain location information of the first resource; or a relative amount between the first resource and a random access resource in the initial BWP.

With reference to the fourth aspect or any one of the foregoing possible implementations, in another possible implementation, the relative amount between the first resource and the random access resource in the initial BWP may include a time domain relative amount and/or a frequency domain relative amount.

With reference to the fourth aspect or any one of the foregoing possible implementations, in another possible implementation, the second information may be carried in a SIB1 message.

With reference to the fourth aspect or any one of the foregoing possible implementations, in another possible implementation, the communication method provided in this application may further include: The access device sends indication information to the terminal device. The indication information may indicate a polarization manner for communicating on a beam. The access device communicates with the terminal device by using an access beam of the terminal device in the polarization manner indicated by the indication information. The polarization manner is indicated, to improve solution diversity.

With reference to the fourth aspect or any one of the foregoing possible implementations, in another possible implementation, the polarization manner may include RHCP or LHCP.

It should be noted that the communication method provided in the fourth aspect of this application and the communication method provided in the third aspect are descriptions from different perspectives of a same technical solution. For specific implementations, reference may be made to each other.

According to a fifth aspect, a communication apparatus is provided. The communication apparatus may be a terminal device, or may be an apparatus or a chip system in the terminal device. The communication apparatus may implement the functions in the possible implementations of the first aspect or the third aspect. The functions may be implemented by hardware, or may be implemented by hardware executing corresponding software. The hardware or the software includes one or more modules corresponding to the foregoing functions. The communication apparatus may include a receiving unit, a determining unit, and a communication unit.

In a possible implementation, the receiving unit is configured to receive first information from an access device. The first information indicates a relative amount between a first BWP of an access beam of the terminal device and a second BWP. The second BWP is a dedicated BWP configured for the access beam of the terminal device. The determining unit is configured to determine the first BWP based on the first information and the second BWP. The communication unit is configured to communicate with the access device in the first BWP by using the access beam of the terminal device.

In another possible implementation, the receiving unit is configured to receive second information from the access device. The second information indicates a first resource for random access performed by the terminal device. The determining unit is configured to determine the first resource based on the second information. The communication unit is configured to perform random access by using the first resource.

It should be noted that the communication apparatus provided in the fifth aspect is configured to perform the communication method provided in the first aspect, the third aspect, any possible implementation of the first aspect, or any possible implementation of the third aspect. For specific implementations of the communication method, reference may be made to each other, and a same effect can be achieved.

According to a sixth aspect, another communication apparatus is provided. The communication apparatus may be an access device, or may be an apparatus or a chip system in the access device. The communication apparatus may implement the functions in the possible implementations of the second aspect or the fourth aspect. The functions may be implemented by hardware, or may be implemented by hardware executing corresponding software. The hardware or the software includes one or more modules corresponding to the foregoing functions. The communication apparatus may include a determining unit, a sending unit, and a communication unit.

In a possible implementation, the determining unit is configured to determine a first BWP of an access beam of a terminal device. The sending unit is configured to send first information to the terminal device. The first information indicates a relative amount between the first BWP and a second BWP. The second BWP is a dedicated BWP configured for the access beam of the terminal device. The communication unit is configured to communicate with the terminal device in the first BWP by using the access beam of the terminal device.

In another possible implementation, the determining unit is configured to determine a first resource for random access performed by the terminal device. The sending unit is configured to send second information to the terminal device. The second information indicates the first resource. The communication unit is configured to perform random access to the terminal device by using the first resource.

It should be noted that the communication apparatus provided in the sixth aspect is configured to perform the communication method provided in the second aspect, the fourth aspect, any possible implementation of the second aspect, or any possible implementation of the fourth aspect. For specific implementations of the communication method, reference may be made to each other, and a same effect can be achieved.

According to a seventh aspect, a terminal device is provided. The terminal device includes a processor and a memory. The memory is configured to store computer-readable instructions (or referred to as computer programs), and the processor is configured to read the computer-readable instructions to implement the method provided in the first aspect, the third aspect, any implementation of the first aspect, or any implementation of the third aspect.

In a possible implementation, the terminal device further includes a transceiver, configured to receive and send data.

According to an eighth aspect, an access device is provided. The access device includes a processor and a memory. The memory is configured to store computer-readable instructions (or referred to as computer programs), and the processor is configured to read the computer-readable instructions to implement the method provided in the second aspect, the fourth aspect, any implementation of the second aspect, or any implementation of the fourth aspect.

In a possible implementation, the access device further includes a transceiver, configured to receive and send data.

According to a ninth aspect, an embodiment of this application further provides a computer-readable storage medium, including instructions. When the instructions are run on a computer, the computer is enabled to perform the communication method in any one of the foregoing aspects or the possible implementations.

According to a tenth aspect, an embodiment of this application further provides a computer program product. When the computer program product is run on a computer, the computer is enabled to perform the communication method in any one of the foregoing aspects or the possible implementations.

According to an eleventh aspect, an embodiment of this application provides a chip system. The chip system includes a processor, and may further include a memory, configured to implement the function of the communication method in any one of the foregoing aspects or the possible implementations. The chip system may include a chip, or may include a chip and another discrete component.

According to a twelfth aspect, an embodiment of this application provides a chip system. The chip system includes one or more interface circuits and one or more processors. The interface circuit and the processor are interconnected through a line. The processor receives and executes computer instructions by using the interface circuit, so that the chip system is enabled to perform the communication method in any one of the foregoing aspects or the possible implementations.

According to a thirteenth aspect, a communication system is provided. The communication system includes the terminal device described in any one of the foregoing aspects or the possible implementations, and the access device described in any one of the foregoing aspects or the possible implementations.

It should be understood that descriptions of technical features, technical solutions, beneficial effects, or similar statements in this application do not imply that all features and advantages can be implemented in any single embodiment. On the contrary, it may be understood that the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily be specific to a same embodiment. Further, the technical features, technical solutions, or beneficial effects described in the embodiments may be combined in any proper manner. A person skilled in the art may understand that a specific embodiment may be implemented without using one or more specific technical features, technical solutions, or beneficial effects of the embodiment. In other embodiments, additional technical features and beneficial effects may further be identified in a specific embodiment that does not reflect all the embodiments.

DESCRIPTION OF EMBODIMENTS

Figure 1:
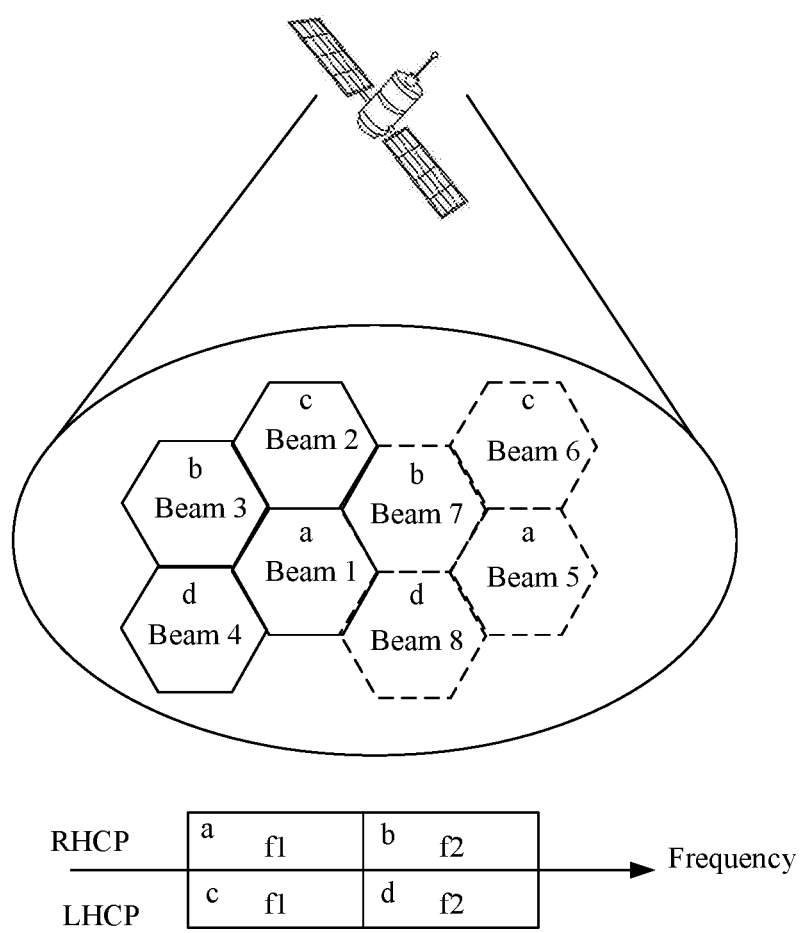
FIG. 1 is a schematic diagram of a common reuse solution in satellite communication in the conventional technology.

In embodiments of this application, to clearly describe the technical solutions in the embodiments of this application, words such as "first" and "second" are used to distinguish between same items or similar items whose functions are basically the same. A person skilled in the art may understand that the terms such as "first" and "second" do not limit a quantity or an execution sequence, and the terms such as "first" and "second" do not indicate a definite difference. There is no chronological order or no size order between the technical features described by the "first" and the "second".

In addition, in the embodiments of this application, the word "example" or "for example" is used to represent giving an example, an illustration, or a description. Any embodiment or design scheme described as "in an example" or "for example" in the embodiments of this application should not be explained as being more preferred or having more advantages than another embodiment or design scheme. Exactly, use of the word "example", "for example", or the like is intended to present a relative concept in a specific manner for ease of understanding.

In the descriptions of this application, "I" represents an "or" relationship between associated objects unless otherwise specified. For example, A/B may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in the description of this application, "a plurality of" means two or more than two, unless otherwise specified. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

In the embodiments of this application, "at least one" may also be "one or more", and "a plurality of" may be two, three, four, or more. This is not limited in this application.

It should be noted that in this application, A sends content to B. When A and B are not directly connected in a network architecture, the content may be forwarded level by level through a network element between A and B, so that the content reaches B. In this specification, it indicates that "A sends the content to B".

In addition, a network architecture and a scenario described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and the emergence of new service scenarios, the technical solutions provided in the embodiments of this application are also applicable to similar technical problems.

Before the embodiments of this application are described, nouns in this application are explained and described herein. Details are not described one by one in the following.

A beam may be different space resources formed by using a large-scale antenna array in mobile communication, and is used to improve a communication capacity.

An access beam of a terminal device may be a beam (a space resource) used by the terminal device to communicate with an access device when the terminal device accesses a core network by using the access device. Alternatively, the terminal device may be referred to as a terminal device that accesses a beam. The access beam of the terminal device may be determined and indicated to the terminal device by the access device. When relative locations of the terminal device and the access device change, the access device may adjust the access beam of the terminal device, and indicate the terminal device to perform beam switching, to improve communication reliability.

An initial BWP (which may also be referred to as an initial BWP) may be a type of BWP defined in a new radio (NR) protocol, and the initial BWP may be used by UE to receive a system broadcast message. In addition, the NR protocol specifies that the initial BWP may be used by the terminal device to obtain random access channel (PRACH) resource configuration and initiate random access. For example, the initial BWP in this specification may be an initial BWP (that is, BWP #0) defined in 3GPP TS38.331.

A dedicated BWP (which may also be referred to as a dedicated BWP) is another type of BWP defined in the NR protocol, and the dedicated BWP may be used for data service transmission. A bandwidth of the dedicated BWP may be greater than a bandwidth of the initial BWP. The access device may deliver, to the terminal device in an RRC message, time-frequency resource location information of all dedicated BWPs supported by communication, and configure the dedicated BWP for the access beam of the terminal device in a process of communicating with the terminal device. The configured dedicated BWP is used by the terminal device to communicate with the access device. For example, the dedicated BWP in this specification may be dedicated BWPs (that is, BWP #1 to BWP #4) defined in 3GPP TS38.311.

A first BWP of the beam may be a BWP actually transmitting data for the terminal device that accesses the beam and that is defined in this application.

The dedicated BWP of the beam may be a BWP that is specified by the access device for the beam from dedicated BWPs defined in the protocol and that transmits data for the terminal device that accesses the beam.

A PRACH resource may be a resource configured by the access device for the terminal device for random access. Random access resource configuration indicates a time-frequency resource location of the random access resource. In beam communication, the random access resource is at a beam granularity, and a resource for random access used by the terminal device that accesses a beam is referred to as a random access resource of the beam.

The following briefly describes beam communication and a BWP in this application.

In a next-generation communication system (including land mobile communication or satellite mobile communication), to improve a system capacity, a base station (including a satellite base station, a ground base station, and the like) is usually equipped with a large-scale antenna array system, and a plurality of beams are simultaneously formed (for example, a Viasat-3 satellite includes more than 1000 beams), to provide transmission for different users.

In a multi-beam satellite communication system, because a near-far effect is not obvious, signal strength of a user at a cell center and that of a user at a cell edge are slightly different, and inter-beam/cell interference is severe. To suppress the inter-beam interference, a satellite network may use frequency and polarization reusing.

FIG. 1 shows a common reusing solution in satellite communication. In the reusing solution shown in FIG. 1, a piece of reusing type information (shown as a, b, c, d in the figure) indicates a combination of a frequency and a polarization manner. As shown in FIG. 1, terminal devices that access a beam 1 and a beam 5 both perform communication in a frequency f1 and an RHCP polarization manner. Terminal devices that access a beam 2 and a beam 6 both perform communication in the frequency f1 and an LHCP polarization manner. Terminal devices that access a beam 3 and a beam 7 both perform communication in a frequency f2 and the RHCP polarization manner. Terminal devices that access a beam 4 and a beam 8 both perform communication in the frequency f2 and the LHCP polarization manner.

A BWP is a subset of a cell system bandwidth, and a receive bandwidth and a transmit bandwidth of a terminal device may be flexibly adjusted by using bandwidth adaptation in NR, so that the receive bandwidth and the transmit bandwidth of the terminal device may be different from the cell bandwidth, to avoid a resource waste. Different BWPs include time domain resources and frequency domain resources, and one BWP may be uniquely indicated by using a time domain resource location and a frequency domain resource location. Currently, the BWP is mainly classified into two types: an initial BWP and a dedicated BWP.

Figure 2:
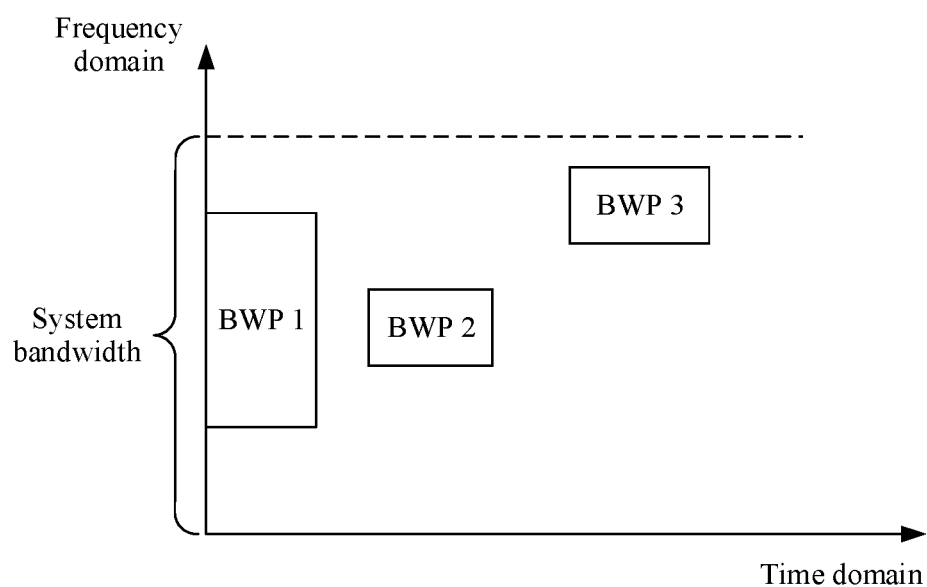
FIG. 2 is a schematic diagram of a BWP configuration scenario according to the conventional technology.

FIG. 2 shows a BWP configuration scenario. Time-frequency resource locations of three BWPs (a BWP 1, a BWP 2, and a BWP 3) configured for a terminal device, and a location relationship between the BWPs and a system bandwidth of a cell accessed by the terminal device may be shown in FIG. 2. A bandwidth of the BWP 1 is 40 MHz, a carrier spacing of the BWP 1 is 15 kHz, a bandwidth of the BWP 2 is 10 MHz, a carrier spacing of the BWP 2 is 15 kHz, a bandwidth of the BWP 3 is 10 MHz, and a carrier spacing of the BWP 3 is 60 kHz.

For example, when the terminal device is in a low-activity period, a base station may indicate the terminal device to save power of UE in a small-bandwidth BWP (for example, the BWP 2).

In a process of using a BWP for communication, there are following two disadvantages.

On one hand, currently a single NR cell supports a maximum of four downlink-dedicated BWPs and four uplink-dedicated BWPs. If the terminal device has an uplink auxiliary link, a maximum of eight uplink dedicated BWPs may be supported. A single cell supports a limited quantity of dedicated BWPs. When a quantity of beams configured for the cell is greater than a quantity of dedicated BWPs supported by the cell, the dedicated BWP may be reused between beams to improve a communication capacity of the terminal device in a connected mode when transmitting data.

Figure 3:
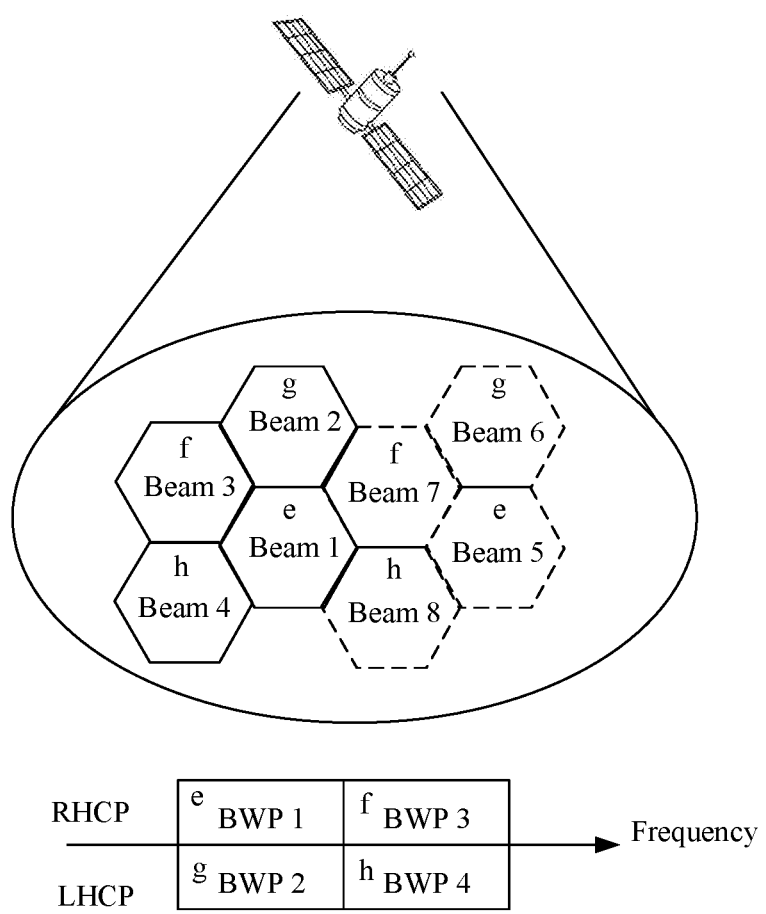
FIG. 3 is a schematic diagram of a scenario in which a dedicated BWP is reused inter beams according to the conventional technology.

FIG. 3 shows a scenario in which a dedicated BWP is reused between beams. As shown in FIG. 3, a cell is configured with eight beams in total, and four dedicated BWPs are configured. Every two beams share one dedicated BWP. In FIG. 3, a same piece of reusing flag information is used (shown as e, f, g, h in FIG. 3) to indicate that a same dedicated BWP is reused. It should be understood that a same dedicated BWP is configured for beams that share the same dedicated BWP. For example, as shown in FIG. 3, a beam 3 and a beam 7 share a dedicated BWP 3, that is, bandwidths of dedicated BWPs configured for the beam 3 and the beam 7 are the same. A beam 4 and a beam 8 share a dedicated BWP 4, that is, bandwidths of dedicated BWPs configured for the beam 4 and the beam 8 are the same.

However, during satellite communication, services are unevenly distributed in different beams. In FIG. 3, 50 terminal devices may be accessed in the beam 3, and only 10 terminal devices are accessed in the beam 7. The two beams share same BWP configuration (the dedicated BWP 3). From a perspective of the beam 7, communication resources are wasted.

Figure 4:
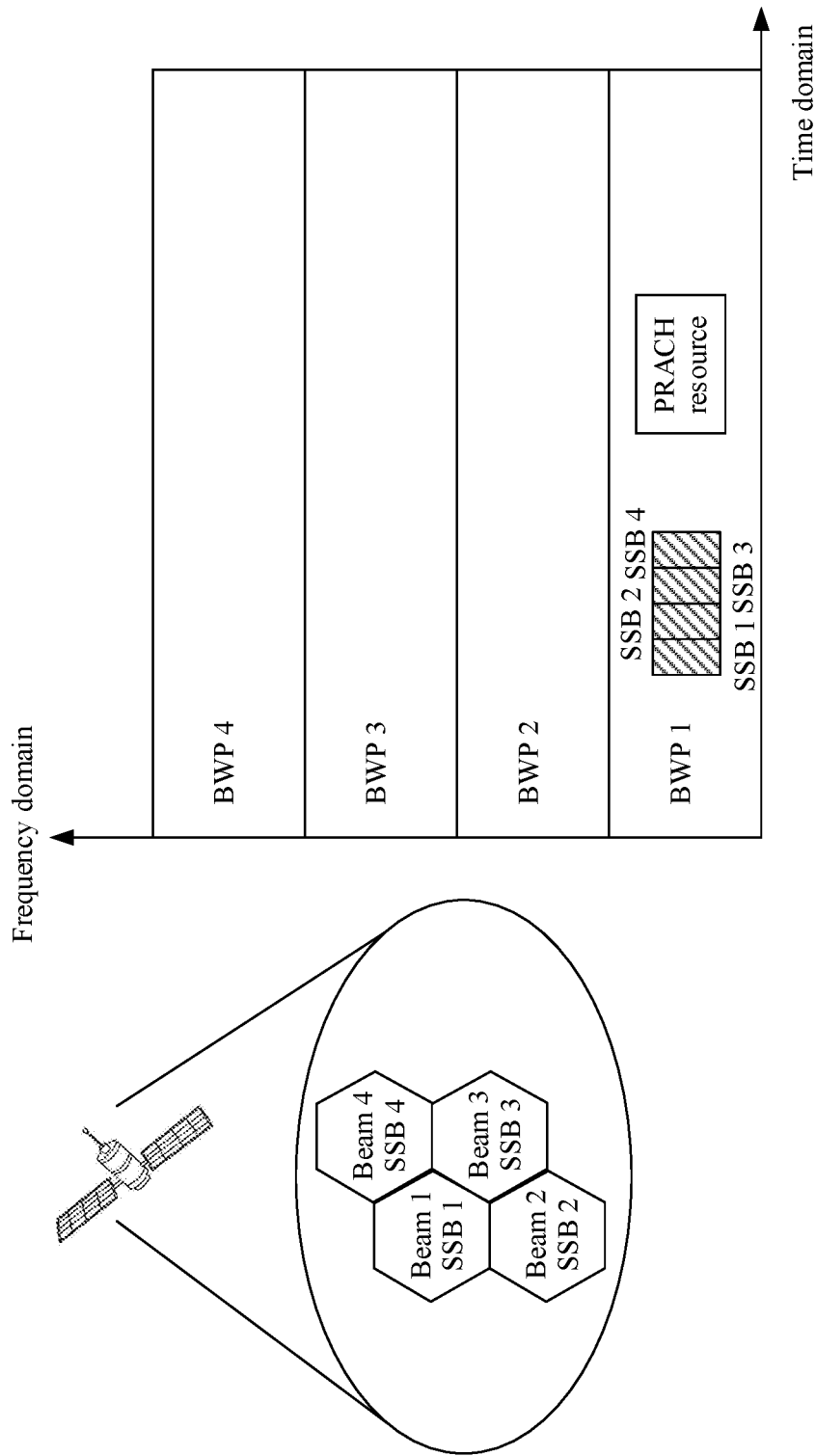
FIG. 4 is a schematic diagram of a scenario of identifying a beam according to the conventional technology.

On the other hand, an existing 5th generation mobile network uses a synchronization signal and physical broadcast channel block (SSB) to identify a beam, and an SSB number one-to-one corresponds to a beam identifier. FIG. 4 shows a scenario of identifying a beam. As shown in FIG. 4, a beam 1, a beam 2, a beam 3, and a beam 4 respectively correspond to an SSB 1, an SSB 2, an SSB 3, and an SSB 4. A BWP 1 is an initial BWP, and SSBs corresponding to all beams are sent in the BWP 1 in a time-sharing scanning manner. A process in which a terminal device performs random access may include: An access device indicates, to the terminal device in a coverage area, an access beam of the terminal device and a location of an initial BWP; the terminal device listens, in the BWP 1, an SSB corresponding to the access beam of the terminal device accesses, and demodulates the SSB to obtain PRACH configuration, where the PRACH configuration indicates a specific location of a PRACH resource configured by the access device for the terminal device; and then the terminal device initiates random access on the PRACH resource. Currently, an existing protocol specifies that the PRACH resource is configured in the initial BWP.

However, because a satellite communication network has a large quantity of beams and a large coverage area, if UEs of all beams access the network in a centralized manner within the initial BWP, a network access capacity is limited and an access delay increases.

In view of this, the solution provided in this application includes: flexibly configuring, based on a service requirement of a terminal device that accesses a beam, a BWP used to actually transmit data for the terminal device that accesses the beam, where the BWP is different from a dedicated BWP configured by the access device for the access beam of the terminal device; and indicating, to the terminal device, the BWP that actually transmits data of the access beam of the terminal device, to flexibly and dynamically configure the BWP and save resources. In addition, the solution provided in this application may further include: configuring a random access resource outside the initial BWP, to increase a random access capacity and reduce a random access delay.

The following describes the implementations of the embodiments of this application in detail with reference to accompanying drawings.

The method provided in this embodiment of this application may be applied to any communication system that supports beam communication, and the communication system may be a terrestrial communication system or a satellite communication system. For example, the communication system may be a 3rd generation partnership project (3GPP) communication system, for example, a long term evolution (LTE) system, or may be a 5G mobile communication system or an NR system. This is not limited.

Figure 5:
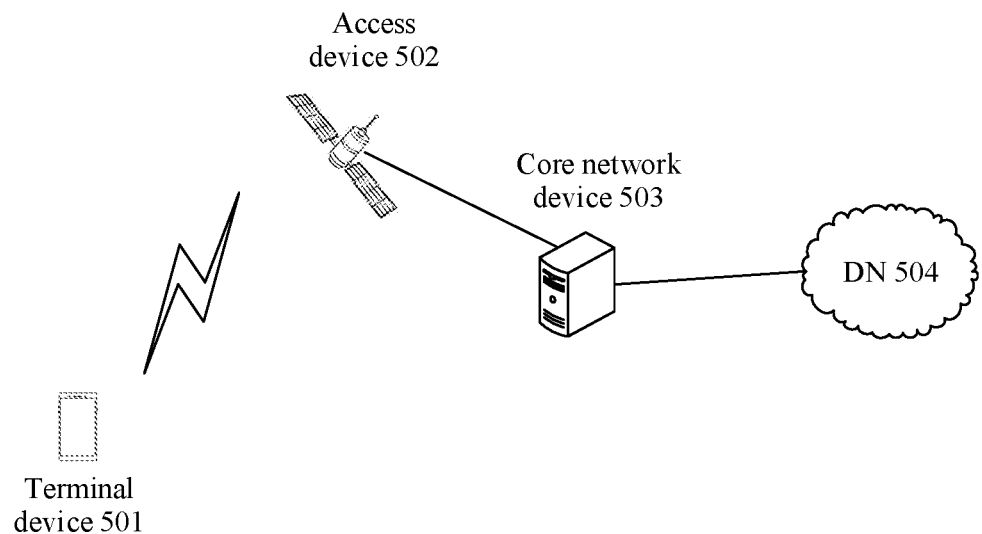
FIG. 5 is an architectural diagram of a communication system supporting beam communication according to an embodiment of this application.

FIG. 5 provides a diagram of an architecture of a communication system supporting beam communication. The communication system may include a terminal device 501, an access device 502, a core network device 503, a data network (DN) 504, and the like. The access device 502 is configured to implement a radio access-related function. The terminal device 501 accesses, by using the access device 502, a core network provided by the core network device 503, accesses the DN 504, and completes service data interaction.

The access device 502 is a device that provides radio access for a terminal, and implements a radio physical layer function, resource scheduling and radio resource management, radio access control and mobility management functions. A large-scale antenna array is deployed in the access device described in this specification, to provide beam communication. The access device in this specification may be an access device in terrestrial mobile communication or an access device in satellite communication. For example, the access device may be a terrestrial base station or a satellite base station. A device through which the terminal device accesses the core network is referred to as the access network device in this specification, and details are not described herein. For example, the access device may be an evolved universal terrestrial radio access network (E-UTRAN) device in a 4th generation mobile communication technology (4G) network, a next generation radio access network (NG-RAN) device in a 5G network, an evolved Node B (eNodeB), a Wi-Fi access point (AP), a world interoperability for microwave access (WIMAX) base station (BS), and the like.

The terminal device in this embodiment of this application may be a device having a wireless transceiver function. The terminal device may be deployed on the land, for example, the terminal device is an indoor device, an outdoor device, a handheld device, or a vehicle-mounted device; or the terminal device may be deployed on the water (for example, on a ship); or the terminal device may be deployed in the air (for example, on a plane, a balloon, or a satellite). The terminal device may be user equipment (UE), and the UE is a handheld device, a vehicle-mounted device, a wearable device, or another device that has a wireless communication function. For example, the UE may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like.

It should be noted that the architecture of the communication system shown in FIG. 5 is merely an example architectural diagram, and a quantity of network elements included in the communication system shown in FIG. 5 is not limited in this embodiment of this application. Although not shown, in addition to the network element shown in FIG. 5, the communication system shown in FIG. 5 may further include another functional entity. In addition, the naming of the network element in the architecture in FIG. 5 is merely an example, and is not limited.

The following describes the embodiments of this application in detail with reference to the accompanying drawings.

It should be noted that in the following embodiments of this application, names of messages between network elements, names of parameters in messages, or the like are merely examples, and may be other names during specific implementation. This is not limited in the embodiments of this application.

Figure 6:
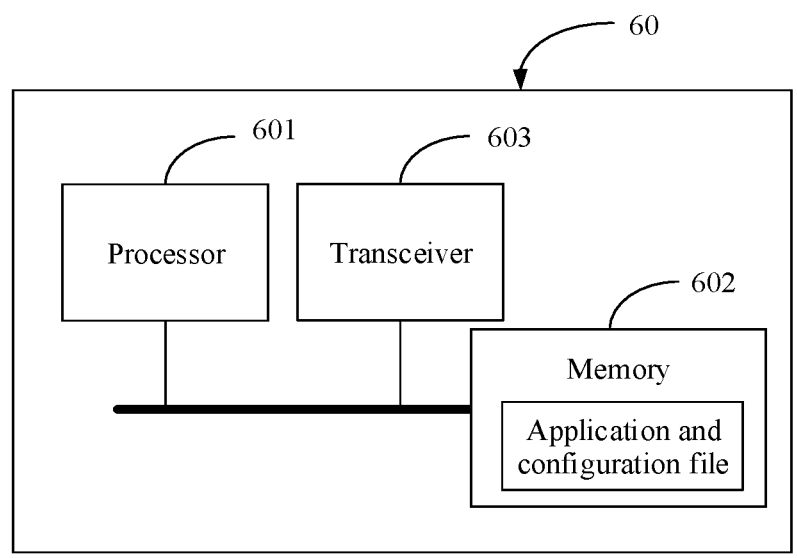
FIG. 6 is a schematic diagram of a structure of a communication apparatus according to an embodiment of this application.

According to one aspect, an embodiment of this application provides a communication apparatus, configured to perform the communication method provided in this application. The communication apparatus may be deployed in a terminal device or an access device in a communication system shown in FIG. 6. FIG. 6 shows a communication apparatus 60 related to the embodiments of this application. As shown in FIG. 6, the communication apparatus 60 may include a processor 601, a memory 602, and a transceiver 603.

The following describes each component of the communication apparatus 60 in detail with reference to FIG. 6.

The memory 602 may be a volatile memory, for example, a random-access memory (RAM); or a non-volatile memory, for example, a read-only memory (ROM), a flash memory, a hard disk drive (HDD), or a solid-state drive (SSD); or a combination of the foregoing types of memories. The memory 602 is configured to store program code, a configuration file, or other content that can implement the method in this application.

The processor 601 is a control center of the communication apparatus 60. For example, the processor 601 may be a central processing unit (CPU), or may be an application-specific integrated circuit (ASIC), or may be configured as one or more integrated circuits implementing the embodiments of this application, for example, one or more microprocessors, or one or more field programmable gate arrays (FPGAs).

The transceiver 603 is configured to communicate with another device by the communication apparatus 60.

In a possible implementation, when the communication apparatus 60 is deployed in the terminal device, the processor 601 runs or executes a software program and/or module stored in the memory 602, and invokes data stored in the memory 602, to execute the following functions:

receiving first information from the access device by using the transceiver 603, and determining a first BWP of an access beam of the communication apparatus 60 based on the received first information and a second BWP configured for the access beam of the terminal device in which the communication apparatus 60 is located; and communicating with the access device in the determined first BWP by using the accessed beam. The first information indicates a relative amount between the first BWP and the second BWP. The second BWP is a dedicated BWP configured for the access beam of the terminal device in which the communication apparatus 60 is located. The first BWP is different from the second BWP.

In another possible implementation, when the communication apparatus 60 is deployed in the access device, the processor 601 runs or executes the software program and/or module stored in the memory 602, and invokes the data stored in the memory 602, to execute the following functions:

determining the first BWP of the access beam of the terminal device; sending the first information to the terminal device by using the transceiver 603, where the first information indicates the relative amount between the first BWP and the second BWP, the second BWP is the dedicated BWP configured for the access beam of the terminal device, and the first BWP is different from the second BWP; and communicating with the terminal device in the first BWP by using the access beam of the terminal device.

In still another possible implementation, when the communication apparatus 60 is deployed in the terminal device, the processor 601 runs or executes the software program and/or module stored in the memory 602, and invokes the data stored in the memory 602, to execute the following functions:

receiving second information by using the transceiver 603, where the second information indicates a first resource used by the terminal device in which the communication apparatus 60 is located to perform random access, and the first resource is located outside a time-frequency resource of an initial BWP; determining the first resource based on the second information; and performing random access by using the first resource.

In yet another possible implementation, when the communication apparatus 60 is deployed in the access device, the processor 601 runs or executes the software program and/or module stored in the memory 602, and invokes the data stored in the memory 602, to execute the following functions:

determining the first resource on which the terminal device performs random access, and sending the second information to the terminal device by using the transceiver 603, where the second information indicates the first resource; and performing random access to the terminal device by using the first resource.

According to another aspect, an embodiment of this application provides a communication method. The method is applied to a process in which a terminal device enters a connected state to communicate with an access device. It should be noted that communication processes in which an access device communicates with terminal devices in a coverage area of the access device are the same. The following describes the communication method provided in the embodiments of this application by using an example of a communication process in which the access device communicates with one terminal device in the coverage area of the access device. Details are not described again. The terminal device may be any terminal device in the coverage area of the access device. This is not limited in this embodiment of this application.

Figure 7:
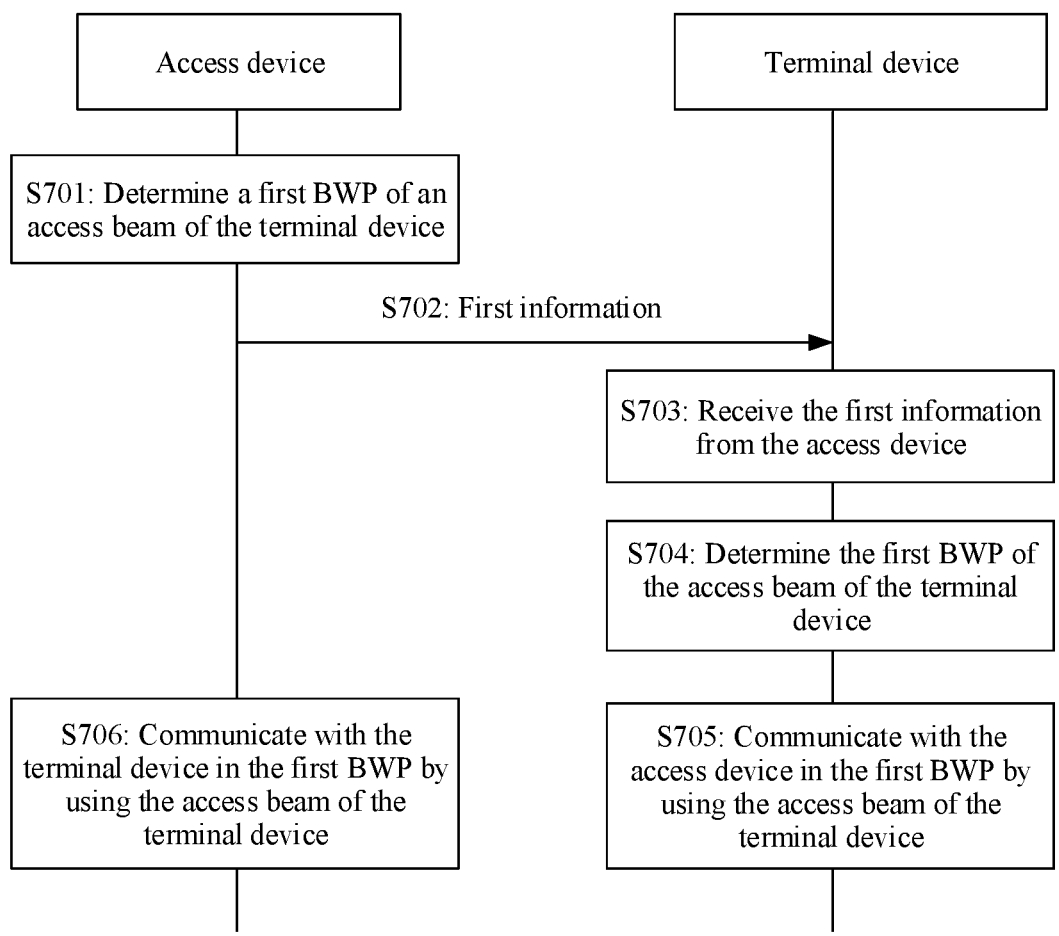
FIG. 7 is a schematic flowchart of a communication method according to an embodiment of this application.

As shown in FIG. 7, the communication method provided in this embodiment of this application may include the following steps.

S701: An access device determines a first BWP of an access beam of a terminal device.

The first BWP is a BWP that is configured by the access device based on a service requirement of the beam and that actually transmits data for the terminal device that accesses the beam. The first BWP may be different from a second BWP, and the second BWP is a dedicated BWP configured for the beam. The first BWP of the access beam of the terminal device may be referred to as a first BWP of the beam.

In a possible implementation, that the first BWP may be different from the second BWP may alternatively be: The first BWP is a portion or all of the second BWP.

It should be noted that a resource location of the dedicated BWP is explicitly specified in a protocol of a communication system, and details are not described herein again.

In S701, the access device may determine the first BWP based on a preset expression, a preset mapping relationship, or in another manner. This is not limited in this application.

For example, the preset expression may be configured to calculate first BWPs of different beams. Input of the preset expression is a quantity of terminal devices that currently accesses a beam and a resource location of a dedicated BWP configured for the beam, and output of the preset expression is a first BWP of the beam.

For another example, the preset mapping relationship may be configured. The preset mapping relationship may include different values of a quantity of terminal devices that access a beam and information about first BWPs corresponding to different dedicated BWPs, and the information about the first BWP indicates a relative amount of the first BWP.

Table 1 shows a preset mapping relationship. When the dedicated BWP configured for the access beam of the terminal device is a dedicated BWP A, and nine terminal devices currently access the beam, the access device in S701 may query the mapping relationship shown in Table 1, and determine that a bandwidth of the BWP (that is, the first BWP) that actually transmits data for the terminal device that accesses the beam is 0.1 times a bandwidth of the dedicated BWP A, and a start frequency is a start frequency of the dedicated BWP A.

TABLE 1

|  | Dedicated BWP A | Dedicated BWP B | ... |
|---|---|---|---|
| 0 to 10 terminal devices are accessed | A scaling factor = 0.1, and a start frequency is a start frequency of a dedicated BWP | A scaling factor = 0.3, and a start frequency is a center frequency of a dedicated BWP | ... |
| 11 to 50 terminal devices are accessed | / | / | ... |
| 51 to 100 terminal devices are accessed | A scaling factor = 0.5, and an end frequency is an end frequency of a dedicated BWP | / | ... |
| ... | ... | ... | ... |

It should be noted that the foregoing example is merely used as an example, and constitutes no specific limitation.

For example, the access device may perform S701 when specifying the access beam of the terminal device for the terminal device or at another occasion. This is not limited in this embodiment of this application. The access beam of the terminal device for the terminal device may be specified when the terminal device accesses the access device and enters a connected state, or when beam switching occurs because a relative location between the terminal device and the access device changes, or another. This is not limited in this embodiment of this application.

S702: The access device sends first information to the terminal device.

The first information indicates a relative amount between the first BWP of the access beam of the terminal device and the second BWP. Information indicating the relative amount between the first BWP of the access beam of the terminal device and the second BWP may be used as the first information. This is not limited in this application.

A time-frequency resource location of the first BWP may be uniquely determined based on the first information and location information of the second BWP. The location information of the second BWP indicates a time-frequency resource location of the second BWP.

In a possible implementation, the first information may include one or more of the following information: a scaling factor, a frequency offset, or a beam number.

The scaling factor may be a ratio of a bandwidth of the first BWP to a bandwidth of the second BWP. The frequency offset may be an offset of a base frequency of the first BWP relative to a reference frequency in frequency domain of the second BWP. The base frequency may be any frequency in frequency domain of the first BWP, and the reference frequency may be any frequency in the frequency domain of the second BWP. The beam number is indicated by one or more beam numbers associated with the BWPs.

In a possible implementation, the base frequency may be a start frequency of the frequency domain of the first BWP, a center frequency of the frequency domain of the first BWP, or an end frequency of the frequency domain of the first BWP.

In another possible implementation, the reference frequency may be a start frequency of the frequency domain of the second BWP, a center frequency of the frequency domain of the second BWP, or an end frequency of the frequency domain of the second BWP.

In still another possible implementation, the frequency offset may be a positive or negative number, and is used to implement offset in a low frequency direction or offset in a high frequency direction.

In S702, the access device may add the first information to a message and send the message to the terminal device. A type of the message is not limited in this embodiment of this application.

In a possible implementation, the access device adds the first information to an RRC message and sends the RRC message to the terminal device, or the access device may add the first information to a message dedicated to sending the first information and send the message to the terminal device.

For example, the access device may send the first information by using the following BWP information element information element:

```
BWP information element
-- ASN1START
-- TAG-BWP-START
BWP ::= SEQUENCE {
   locationAndBandwidth      INTEGER (0..37949),
   subcarrierSpacing         SubcarrierSpacing,
   cyclicPrefix              ENUMERATED { extended }}
OPTIONAL -- Need R}
   scaling factor            ENUMERATED {1/8,1/4,1/2,1,2,4,8,......}
   offset                    Integer(1,2,3,......)
   Polarization              (RHCP,LHCP)
   SSB index                 Integer(0,1,..,63)
-- TAG-BWP-STOP
-- ASN1STOP.
```

Scaling factor may be a scaling factor of the first BWP of the access beam of the terminal device relative to a bandwidth size of the dedicated BWP of the beam. Offset may be an offset of the first BWP of the access beam of the terminal device relative to a dedicated BWP frequency domain reference frequency of the beam. Polarization may be a polarization manner of the access beam of the terminal device, and SSB index is indicated by a beam number associated with BWP.

Figure 8:
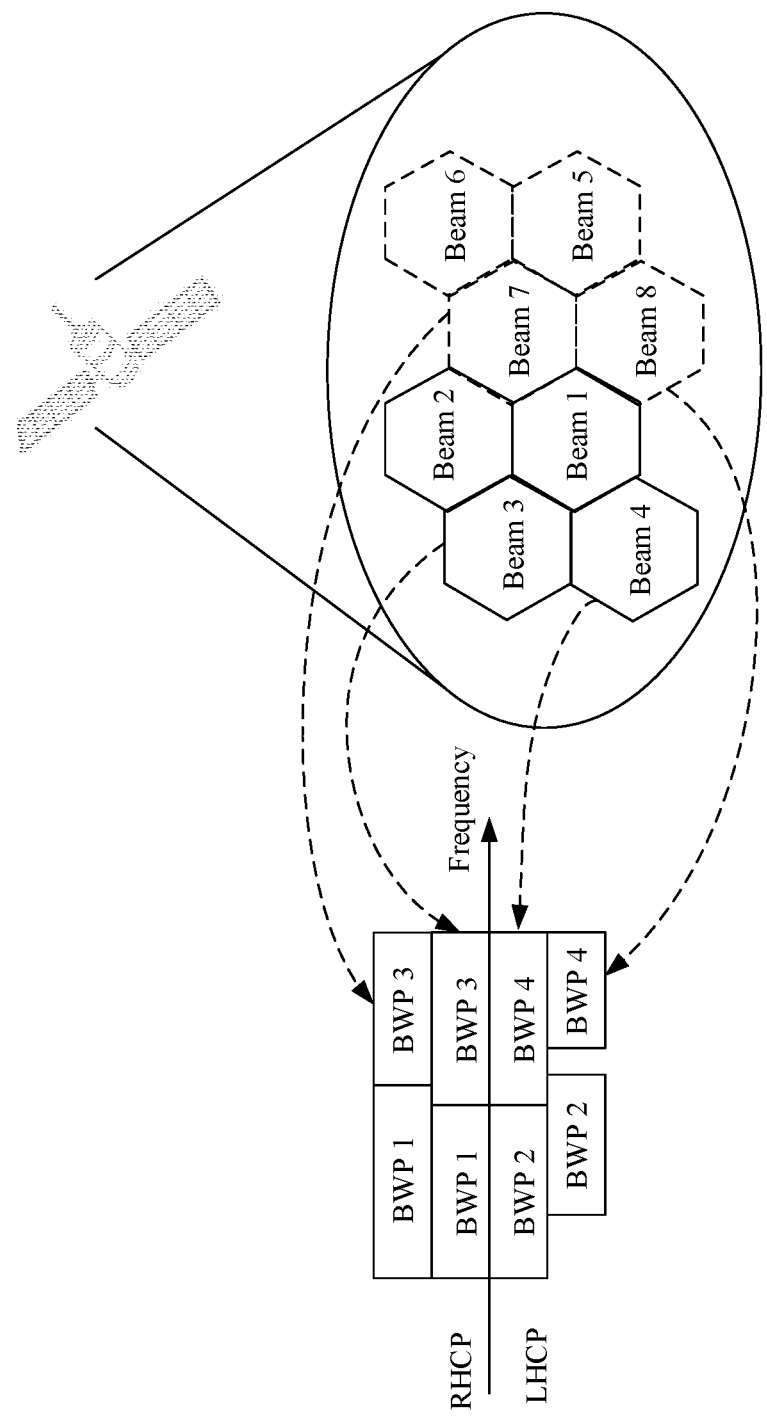
FIG. 8 is a schematic diagram of a scenario of a dedicated BWP for inter-beam reusing according to an embodiment of this application.

As shown in FIG. 8, a same dedicated BWP is configured for every two beams, a dedicated BWP 1 is configured for a beam 1 and a beam 5, a dedicated BWP 2 is configured for a beam 2 and a beam 6, a dedicated BWP 3 is configured for a beam 3 and a beam 7, and a dedicated BWP 4 is configured for a beam 4 and a beam 8. However, because service loads of beams are different, bandwidth sizes of first BWPs configured for the beams may be different. The access device may newly add a scaling factor field, an offset field, and an SSB index field to the BWP information element, to dynamically configure, based on a dedicated BWP, a BWP that actually transmits data. A dashed arrow in FIG. 8 indicates a first BWP of each beam. It may be learned from FIG. 8 that bandwidths of first BWPs of different beams configured with a same dedicated BWP are different.

Further, the communication method provided in this embodiment of this application may further include: The access device sends, to the terminal device, location information of a dedicated BWP that is supported by a communication system and that is accessed by the terminal device. The location information is used by the terminal device to determine a time-frequency resource location of the BWP that actually transmits data for the terminal device. The location information of the dedicated BWP indicates the time-frequency resource location of the dedicated BWP.

That the access device sends, to the terminal device, the location information of the dedicated BWP supported by the communication system accessed by the terminal device may be that the access device sends, to the terminal device, location information of each dedicated BWP supported by the communication system accessed by the terminal device.

In a possible implementation, a quantity of dedicated BWPs supported by the communication system accessed by the terminal device may be any one of the following: 4, 8, 16, 32, or 64.

In a possible implementation, the access device may send, to the terminal device by using the RRC message, the location information of the dedicated BWP supported by the communication system accessed by the terminal device.

For example, that the access device sends, to the terminal device, the location information of the dedicated BWP supported by the communication system accessed by the terminal device may be implemented by using the following BWP-ID information element information element:

```
BWP-ID information element
-- ASN1START
-- TAG-BWP-ID-START
BWP-Id ::=            INTEGER (0..maxNrofBWPs)
-- TAG-BWP-ID-STOP
-- ASN1STOP
``` maxNrofBWPs is the quantity of dedicated BWPs supported by the communication system accessed by the terminal device, and a value of maxNrofBWPs may be any one of {4, 8, 16, 32, 64}.

S703: The terminal device receives the first information from the access device.

The first information received by the terminal device in S703 is the first information sent by the access device in S702. The first information and a sending form of the first information is described in detail in S702. Details are not described herein again.

S704: The terminal device determines, based on the first information and the second BWP, the first BWP of the access beam of the terminal device.

Further, the communication method provided in this embodiment of this application may further include: Before performing S704, the terminal device receives, from the access device, the location information of the dedicated BWP supported by the communication system accessed by the terminal device. The location information of the dedicated BWP may be used to indicate the time-frequency resource location of the dedicated BWP. The quantity of dedicated BWPs supported by the communication system may be any one of the following: 4, 8, 16, 32, or 64.

It should be noted that, that the terminal device receives, from the access device, the location information of the dedicated BWP supported by the communication system accessed by the terminal device corresponds to an operation in which the access device sends, to the terminal device, the location information of the dedicated BWP supported by the communication system accessed by the terminal device described in S702. For specific implementation, reference may be made to S702, and details are not described herein again.

In S704, that the terminal device determines, based on the first information and the second BWP, the first BWP of the access beam of the terminal device may be implemented as follows: The terminal device determines, based on the first information and the location information of the second BWP, the first BWP of the access beam of the terminal device. Because the first information indicates the relative amount between the first BWP and the second BWP, the first BWP may be determined based on the location information of the second BWP.

For example, it is assumed that the first information is that the scaling factor is 0.5, a frequency offset value is 2 MHz offset from a center frequency to a low frequency direction, and a frequency domain location of the second BWP is a frequency f1 to a frequency f2, In S704, it may be determined that the bandwidth of the first BWP is (f2−f1)*0.5, and a center frequency of the first BWP is f1+(f2−f1)/2−2 MHz. * is a multiplication operation, and/is a division operation.

S705: The terminal device communicates with the access device in the first BWP by using the access beam of the terminal device.

In S705, the terminal device communicates with the access device in the first BWP of the access beam of the terminal device by using the access beam of the terminal device.

S706: The access device communicates with the terminal device in the first BWP by using the access beam of the terminal device.

In S706, the access device communicates with the terminal device in the first BWP of the access beam of the terminal device by using the access beam of the terminal device.

It should be noted that for communication between the access device and the terminal device in S705 and S706, only content of resources (time domain, frequency domain, and space domain) used by the devices is described in this specification, and content of data transmitted in communication is not limited.

According to the communication method provided in this embodiment of this application, the first BWP of the access beam of the terminal device may be configured based on a communication requirement of the terminal device, and the relative amount between the first BWP and the second BWP is indicated by using the first information, to flexibly configure a BWP of a beam. The BWP of the access beam of the terminal device is configured based on an actual communication requirement, and the BWP replaces a fixed dedicated BWP using existing configuration. Therefore, even if a service volume of the terminal device is small, not all resources of the dedicated BWP are occupied. This effectively saves communication resources.

Figure 9:
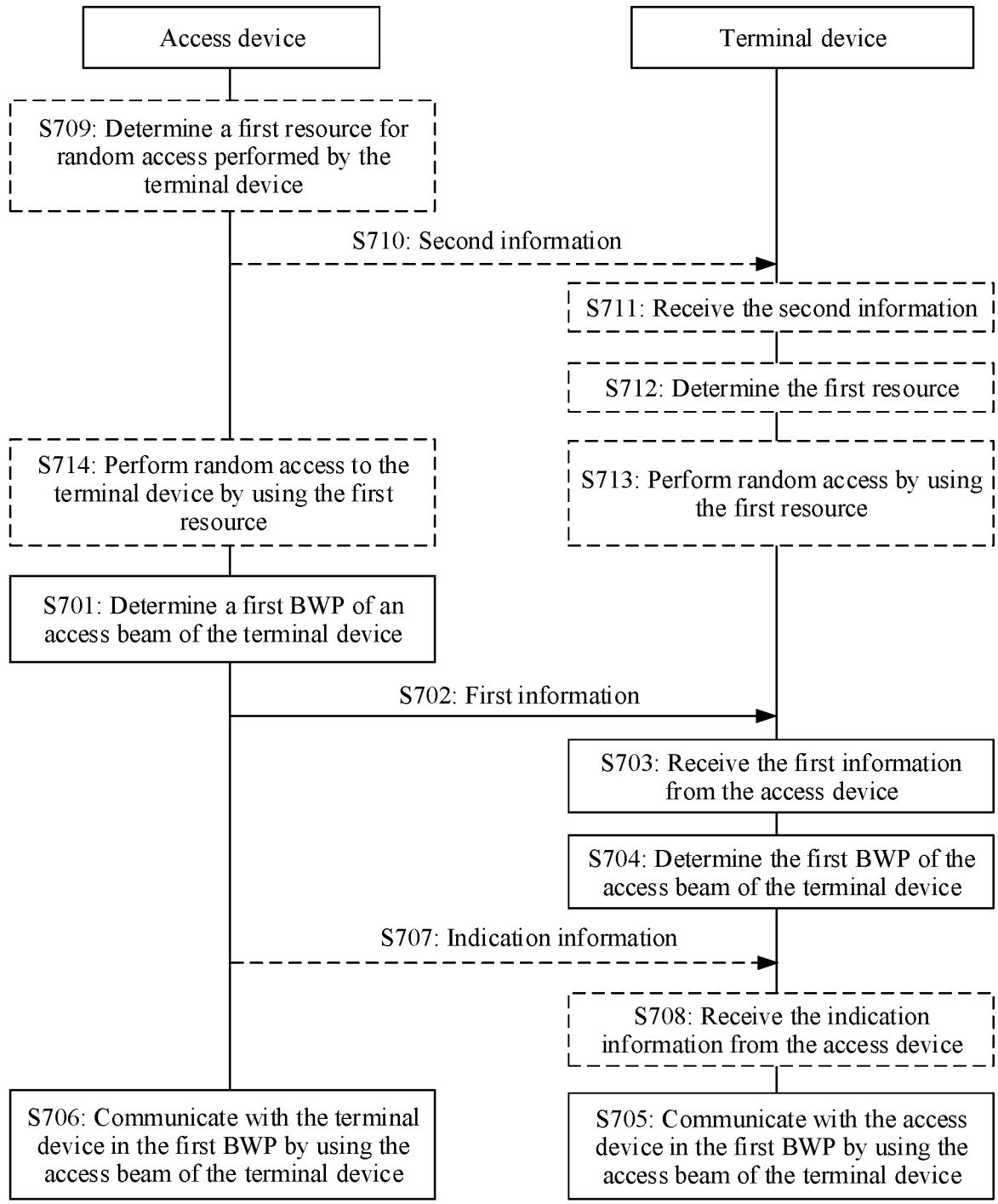
FIG. 9 is a schematic flowchart of another communication method according to an embodiment of this application.

Further, as shown in FIG. 9, before S705, the communication method provided in this embodiment of this application may further include S707 and S708.

S707: The access network device sends indication information to the terminal device.

The indication information indicates a polarization manner of communication on the access beam of the terminal device. The polarization manner is configured by the access device for the beam based on a reusing mechanism. Specific content of the reusing mechanism is not limited in this application.

For example, the polarization manner may include but is not limited to RHCP or LHCP.

S708: The terminal device receives the indication information from the access device.

Based on S707 and S708, S705 may be implemented as follows: The terminal device communicates with the access device in the first BWP by using the access beam of the terminal device in the polarization manner indicated by the indication information.

Based on S707 and S708, S706 may be implemented as follows: The access device communicates with the terminal device in the first BWP by using the access beam of the terminal device in the polarization manner indicated by the indication information.

Further, as shown in FIG. 9, on a basis of S701 to S706, the communication method provided in this embodiment of this application may further include S709 to S714, to complete random access of the terminal device.

S709: The access device determines a first resource for random access performed by the terminal device.

The first resource may be referred to as a random access resource, and the first resource may be located outside a time-frequency resource of an initial BWP, or may be located within the time-frequency resource of the initial BWP.

In S709, the access device may determine, for different terminal devices based on information such as network configuration and resource load, first resources for random access performed by the different terminal devices. A specific determining process is not limited.

Figure 10:
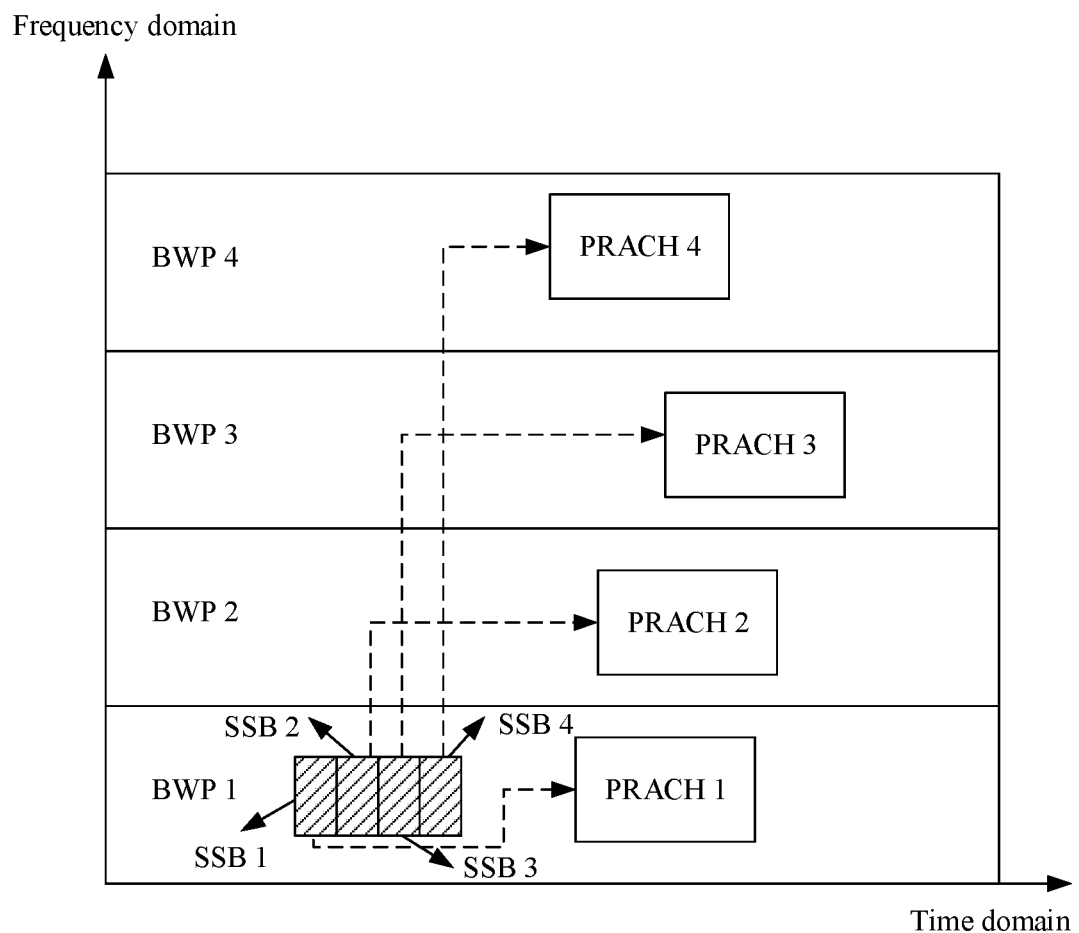
FIG. 10 is a schematic diagram of PRACH resource configuration according to an embodiment of this application.

FIG. 10 shows PRACH resource configuration. PRACH resources corresponding to SSBs corresponding to different beams may be configured outside the initial BWP. As shown in FIG. 10, a dashed arrow indicates a PRACH resource of a beam corresponding to an SSB. A PRACH 1 of a beam corresponding to an SSB 1 is within the initial BWP. Beam random access resources PRACH 2, PRACH 3, and PRACH 4 respectively corresponding to an SSB 2, an SSB 3, and an SSB 4 are located outside the initial BWP.

S710: The access device sends second information to the terminal device.

The second information indicates the first resource. Information that may be used to indicate a time-frequency resource location of the first resource belongs to second information in this specification.

In a possible implementation, the second information may include time domain location information and frequency domain location information of the first resource. To be specific, the second information directly indicates a time-frequency resource location of the first resource by using an absolute value.

In another possible implementation, the second information may include a relative amount between the first resource and a random access resource in the initial BWP. To be specific, the second information indirectly indicates the time-frequency resource location of the first resource in a semi-static manner of a relative value. Because a specific location of the random access resource in the initial BWP is known to the terminal device, the time-frequency resource location of the first resource may be determined based on the random access resource in the initial BWP and the second information.

For example, the second information may be carried in a message for sending. The message may be a SIB 1 message or another message. This is not limited in this embodiment of this application.

For example, that the access device sends the second information to the terminal device in S710 may be implemented by using the following RACH-ConfigCommon information element information element:

```
RACH-ConfigCommon information element
-- ASN1STOP -- ASN1START
-- TAG-RACH-ConfigCommon-START
RACH-ConfigCommon ::=                    SEQUENCE {
  rach-ConfigGeneric                     RACH-ConfigGeneric,
  totalNumberOfRA-Preambles              INTEGER (1..63)
  ssb-perRACH-OccasionAndCB-PreamblesPerSSB CHOICE { }
  rach-beyond-InitialBWP ::=             SEQUENCE {
    Frequency-offset
    Time-offset
  } OPTIONAL
  ...
}
-- TAG-RACH-ConfigCommon-STOP
-- ASN1STOP
```

The first information includes Frequency-offset and Time-offset. Frequency-offset is a frequency offset of the first resource relative to a PRACH resource in the initial BWP; and Time-offset is a time offset of the first resource relative to the PRACH resource in the initial BWP.

S711: The terminal device receives the second information.

The second information received by the terminal device in S711 is the second information sent by the access device in S710. The first information and a sending form of the second information is described in detail in S710. Details are not described herein again.

S712: The terminal device determines the first resource based on the second information.

In a possible implementation, when the second information is the absolute value, the second information explicitly indicates the time-frequency resource location of the first resource. In S712, the terminal device only needs to use a time-frequency resource location indicated by the second information as the time-frequency resource location of the first resource.

In another possible implementation, when the second information is a relative value, the second information indirectly indicates the time-frequency resource location of the first resource. In S712, the terminal device adjusts the random access resource in the initial BWP based on the second information to obtain the time-frequency resource location of the first resource.

S713: The terminal device performs random access by using the first resource.

S714: The access device performs random access to the terminal device by using the first resource.

It should be noted that processes of S713 and S714 are not described in detail in this application.

According to still another aspect, an embodiment of this application provides another communication method. The method is applied to a process in which a terminal device communicates with an access device to perform random access. It should be noted that communication processes in which an access device communicates with terminal devices in a coverage area of the access device are the same. The following describes the communication method provided in the embodiments of this application by using an example of a communication process in which the access device communicates with one terminal device in the coverage area of the access device. Details are not described again. The terminal device may be any terminal device in the coverage area of the access device. This is not limited in this embodiment of this application.

Figure 11:
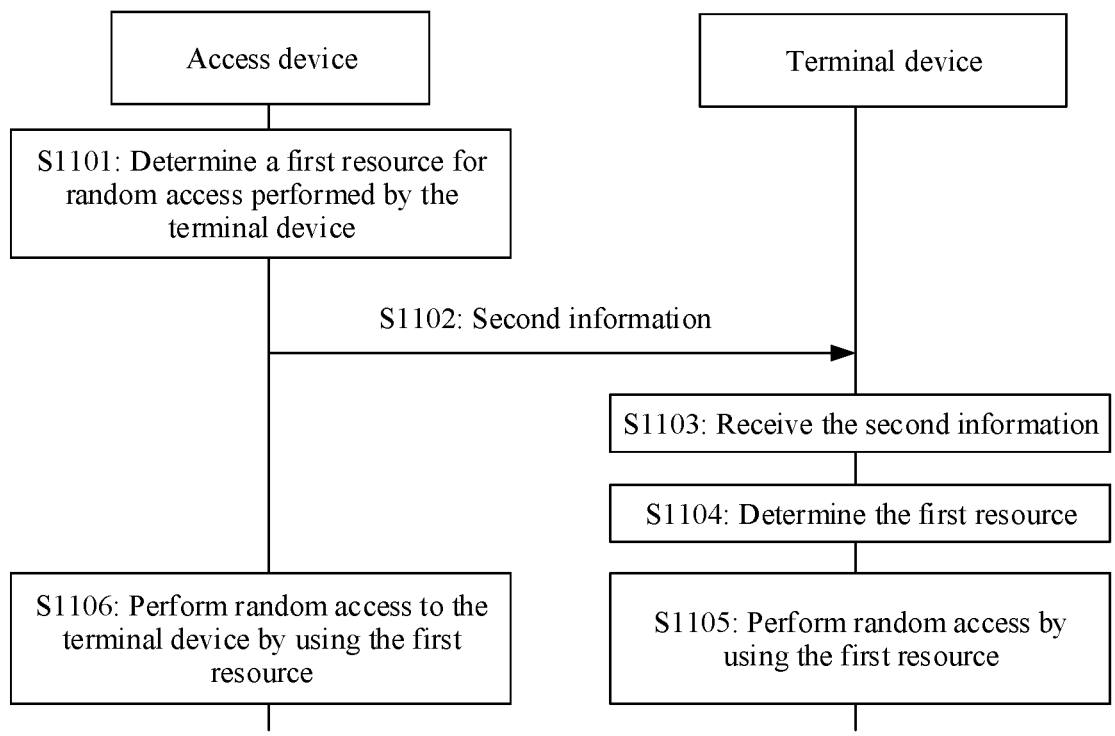
FIG. 11 is a schematic flowchart of still another communication method according to an embodiment of this application.

As shown in FIG. 11, the communication method provided in this embodiment of this application may include the following steps.

S1101: An access device determines a first resource for random access performed by a terminal device.

The first resource may be referred to as a random access resource, and the first resource may be located outside a time-frequency resource of an initial BWP, or may be located within the time-frequency resource of the initial BWP.

It should be noted that, for specific implementation of S1101, refer to S709. Details are not described herein again.

S1102: The access device sends second information to the terminal device.

The second information indicates the first resource. Information that may be used to indicate a time-frequency location of the first resource belongs to second information in this specification.

It should be noted that, for specific implementation of S1102, refer to S710. Details are not described herein again.

S1103: The terminal device receives the second information.

S1104: The terminal device determines the first resource based on the second information.

It should be noted that, for specific implementation of S1104, refer to S712. Details are not described herein again.

S1105: The terminal device performs random access by using the first resource.

S1106: The access device performs random access to the terminal device by using the first resource.

It should be noted that processes of S1105 and S1106 are not described in detail in this application. After S1106, the terminal device may enter a data transmission phase, and the terminal device and the access device may perform data transmission by using the foregoing communication method in S701 to S706. Certainly, the terminal device and the access device may perform data transmission in another manner, which is not limited.

According to the communication method provided by this application, a random access resource of the terminal device may be configured outside the initial BWP, to prevent terminal devices of all beams from performing random access in the initial BWP. This reduces a random access delay, and improves a network access capacity.

It should be noted that an execution sequence of the steps in the communication method provided in this embodiment of this application may be configured based on an actual requirement. The accompanying drawings of this application show only one possible execution sequence, and constitute no limitation.

The foregoing mainly describes the solutions provided in the embodiments of this application from a perspective of interaction between the terminal device and the access device. It may be understood that, to implement the foregoing functions, the terminal device and the access device include corresponding hardware structures and/or software modules for performing the functions. A person of ordinary skill in the art should easily be aware that, in combination with the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, functional modules of the terminal device and the access device may be obtained through division based on the foregoing method examples. For example, each functional module may be obtained through division based on each corresponding function, or two or more functions may be integrated into one processing module. The integrated module may be implemented in a form of hardware, or may be implemented in a form of a software function module. It should be noted that, in this embodiment of this application, module division is an example, and is merely a logical function division. In actual implementation, another division manner may be used.

Figure 12:
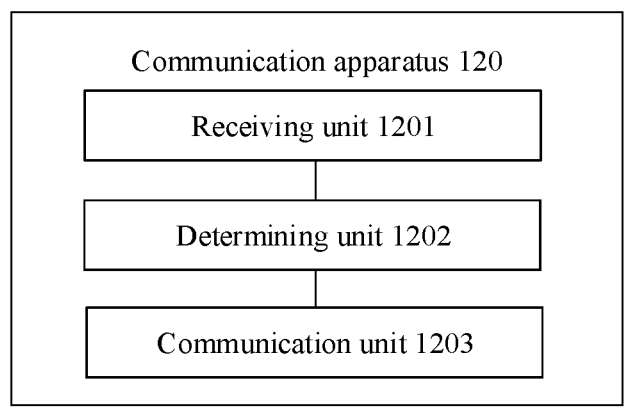
FIG. 12 is a schematic diagram of a structure of another communication apparatus according to an embodiment of this application.

When each functional module is obtained through division based on each corresponding function, FIG. 12 shows a communication apparatus 120 according to an embodiment of this application, configured to implement functions of the terminal device in the foregoing methods. The communication apparatus 120 may be a terminal device, may be an apparatus in the terminal device, or may be an apparatus that can match the terminal device. The communication apparatus 120 may be a chip system. In this embodiment of this application, the chip system may include a chip, or may include a chip and another discrete component. As shown in FIG. 12, the communication apparatus 120 may include a receiving unit 1201, a determining unit 1202, and a communication unit 1203. The receiving unit 1201 is configured to perform S703, S708, and S711 in FIG. 7 or FIG. 9, or S1103 in FIG. 11. The determining unit 1202 is configured to perform S704 and S712 in FIG. 7 or FIG. 9, or S1104 in FIG. 11. The communication unit 1203 is configured to perform S705 and S713 in FIG. 7 or FIG. 9, or S1105 in FIG. 11. All related content of the steps in the foregoing method embodiments may be cited in function descriptions of corresponding function modules. Details are not described herein again.

Figure 13:
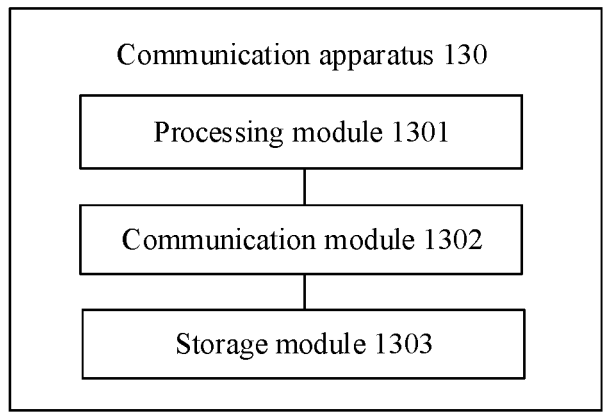
FIG. 13 is a schematic diagram of a structure of still another communication apparatus according to an embodiment of this application.

When each functional module is obtained through division in an integrated manner, FIG. 13 shows a communication apparatus 130 according to an embodiment of this application, configured to implement functions of the terminal device in the foregoing methods. The communication apparatus 130 may be a terminal device, may be an apparatus in the terminal device, or may be an apparatus that can match the terminal device. The communication apparatus 130 may be a chip system. The communication apparatus 130 may include at least one processing module 1301 and a communication module 1302. For example, the processing module 1301 may be configured to perform S704, S705, S712, and S713 in FIG. 7 or FIG. 9, or S1104 and S1105 in FIG. 11. The processing module 1301 may be configured to perform S703, S708, and S711 in FIG. 7 or FIG. 9, or S1103 in FIG. 11 by using the communication module 1302. For details, refer to detailed descriptions in the method examples. Details are not described herein again.

The communication apparatus 130 may further include at least one storage module 1303, configured to store program instructions and/or data. The storage module 1303 is coupled to the processing module 1301. The coupling in this embodiment of this application is indirect coupling or a communication connection between apparatuses, units, or modules for information exchange between the apparatuses, the units, or the modules, and may be in electrical, mechanical, or other forms. The processing module 1301 may cooperate with the storage module 1303. The processing module 1301 may execute the program instructions stored in the storage module 1303. At least one of the at least one storage module may be included in the processing module.

When the processing module 1301 is a processor, the communication module 1302 is a transceiver, and the storage module 1303 is a memory, the communication apparatus 130 in FIG. 13 in this embodiment of this application may be the communication apparatus 60 shown in FIG. 6.

As described above, the communication apparatus 120 or the communication apparatus 130 provided in the embodiments of this application may be configured to implement functions of the terminal device in the methods implemented in the foregoing embodiments of this application. For ease of description, only a part related to the embodiments of this application is shown. For specific technical details that are not disclosed, refer to the embodiments of this application.

Figure 14:
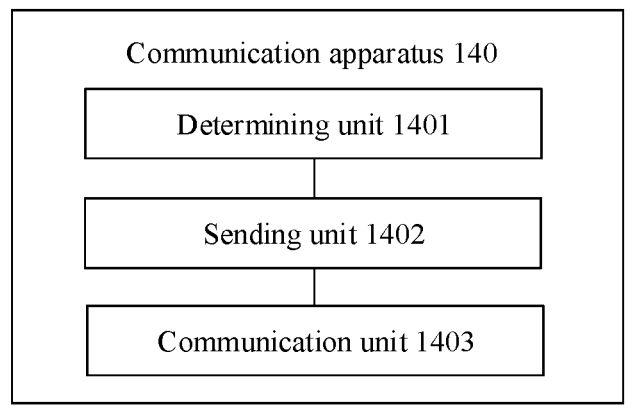
FIG. 14 is a schematic diagram of a structure of yet another communication apparatus according to an embodiment of this application.

When each functional module is obtained through division based on each corresponding function, FIG. 14 shows a communication apparatus 140 according to an embodiment of this application, configured to implement functions of the access device in the foregoing methods. The communication apparatus 140 may be an access device, may be an apparatus in the access device, or may be an apparatus that can match the access device. The communication apparatus 140 may be a chip system. In this embodiment of this application, the chip system may include a chip, or may include a chip and another discrete component. As shown in FIG. 14, the communication apparatus 140 may include a determining unit 1401, a sending unit 1402, and a communication unit 1403. The determining unit 1401 is configured to perform S701 and S709 in FIG. 7 or FIG. 9, or S1101 in FIG. 11. The sending unit 1402 is configured to perform S702, S707, and S710 in FIG. 7 or FIG. 9, or S1102 in FIG. 11. The communication unit 1403 is configured to perform S706 and S714 in FIG. 7 or FIG. 9, or S1106 in FIG. 11. All related content of the steps in the foregoing method embodiments may be cited in function descriptions of corresponding function modules. Details are not described herein again.

Figure 15:
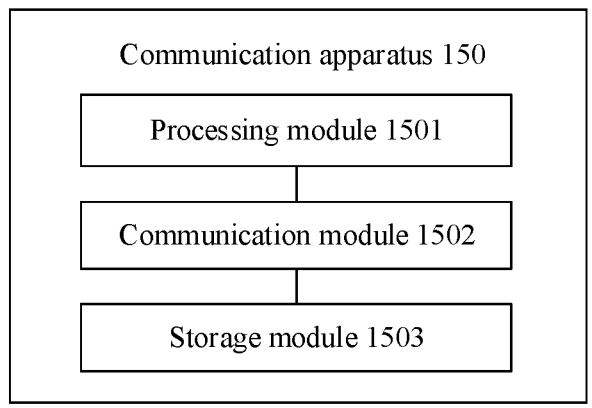
FIG. 15 is a schematic diagram of a structure of yet another communication apparatus according to an embodiment of this application.

When each functional module is obtained through division in an integrated manner, FIG. 15 shows a communication apparatus 150 according to an embodiment of this application, configured to implement functions of the access device in the foregoing methods. The communication apparatus 150 may be an access device, may be an apparatus in the access device, or may be an apparatus that can match the access device. The communication apparatus 150 may be a chip system. In this embodiment of this application, the chip system may include a chip, or may include a chip and another discrete component. The communication apparatus 150 may include at least one processing module 1501 and a communication module 1502. For example, the processing module 1501 may be configured to perform S701, S706, S709, and S714 in FIG. 7 or FIG. 9, or S1101 and S1106 in FIG. 11. The processing module 1501 may be configured to perform S702, S707, and S710 in FIG. 7 or FIG. 9, or S1102 in FIG. 11 by using the communication module 1502. For details, refer to detailed descriptions in the method examples. Details are not described herein again.

The communication apparatus 150 may further include at least one storage module 1503, configured to store program instructions and/or data. The storage module 1503 is coupled to the processing module 1501. The coupling in this embodiment of this application is indirect coupling or a communication connection between apparatuses, units, or modules for information exchange between the apparatuses, the units, or the modules, and may be in electrical, mechanical, or other forms. The processing module 1501 may cooperate with the storage module 1503. The processing module 1501 may execute the program instructions stored in the storage module 1503. At least one of the at least one storage module may be included in the processing module.

When the processing module 1501 is a processor, the communication module 1502 is a transceiver, and the storage module 1503 is a memory, the communication apparatus 150 in FIG. 15 in this embodiment of this application may be the communication apparatus 60 shown in FIG. 6.

As described above, the communication apparatus 140 or the communication apparatus 150 provided in the embodiments of this application may be configured to implement functions of the access device in the methods implemented in the foregoing embodiments of this application. For ease of description, only a part related to the embodiments of this application is shown. For specific technical details that are not disclosed, refer to the embodiments of this application.

Some other embodiments of this application further provide a computer-readable storage medium. The computer-readable storage medium may include computer software instructions. When the computer software instructions are run on a terminal device, the terminal device is enabled to perform the steps performed by the terminal device in the embodiments shown in FIG. 7, FIG. 9, or FIG. 11.

Some other embodiments of this application further provide a computer-readable storage medium. The computer-readable storage medium may include computer software instructions. When the computer software instructions are run on an access device, the access device is enabled to perform the steps performed by the access device in the embodiments shown in FIG. 7, FIG. 9, or FIG. 11.

Some other embodiments of this application further provide a computer program product. When the computer program product is run on a computer, the computer is enabled to perform steps performed by the terminal device or the access device in the embodiments shown in FIG. 7, FIG. 9, or FIG. 11.

Some other embodiments of this application further provide a chip system, and the chip system may be applied to a terminal device. The chip system includes an interface circuit and a processor. The interface circuit and the processor are interconnected through a line. The interface circuit is configured to receive a signal from a memory of the terminal device, and send the signal to the processor. The signal includes computer instructions stored in the memory. When the processor executes the computer instructions, the chip system performs the steps performed by the terminal device in the embodiments shown in FIG. 7, FIG. 9, or FIG. 11.

Some other embodiments of this application further provide a chip system, and the chip system may be applied to an access device. The chip system includes an interface circuit and a processor. The interface circuit and the processor are interconnected through a line. The interface circuit is configured to receive a signal from a memory of the access device, and send the signal to the processor. The signal includes computer instructions stored in the memory. When the processor executes the computer instructions, the chip system performs the steps performed by the access device in the embodiments shown in FIG. 7, FIG. 9, or FIG. 11.

Some other embodiments of this application further provide a communication system. The communication system includes the terminal device described in any one of the foregoing embodiments and the access device described in any one of the foregoing embodiments.

The foregoing description about the implementations allows a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The storage medium includes any medium that can store program code, such as a USB flash drive, a removable hard disk, a read-only memory (ROM), a random access memory (RAM), a magnetic disk, or an optical disc.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, wherein the method comprises:
    receiving, by a terminal device, first information from an access device, wherein the first information indicates a relative amount between a first bandwidth part (BWP) and a second BWP of an access beam of the terminal device, and the second BWP is a dedicated BWP configured for the beam;
    determining, by the terminal device, the first BWP based on the first information and the second BWP; and
    communicating, by the terminal device, with the access device in the first BWP by using the beam.

2. The method according to claim 1, wherein the first information comprises one or more of the following information:
    a scaling factor, a frequency offset, or a beam number, wherein the scaling factor is a ratio of a bandwidth of the first BWP to a bandwidth of the second BWP, the frequency offset is an offset of a base frequency of the first BWP relative to a reference frequency in frequency domain of the second BWP, the base frequency is any frequency in frequency domain of the first BWP, the reference frequency is any frequency in the frequency domain of the second BWP, and the beam number is indicated by one or more beam numbers associated with the BWPs.

3. The method according to claim 1, wherein the method further comprises:
    receiving, by the terminal device from the access device, location information of a dedicated BWP that is supported by a communication system and that is accessed by the terminal device, wherein the location information indicates a time-frequency resource location of the dedicated BWP, and a quantity of supported dedicated BWPs is any one of 4, 8, 16, 32, or 64.

4. The method according to claim 1, wherein the method further comprises:
    receiving, by the terminal device, indication information from the access device, wherein the indication information indicates a polarization manner in which the terminal device communicates on the beam; and
    wherein communicating, by the terminal device, with the access device in the first BWP by using the beam comprises:
        communicating, by the terminal device, with the access device in the first BWP by using the beam in the polarization manner.

5. The method according to claim 1, wherein the method further comprises:
    receiving, by the terminal device, second information, wherein the second information indicates a first resource for random access performed by the terminal device;
    determining, by the terminal device, the first resource based on the second information; and
    performing, by the terminal device, random access by using the first resource.

6. The method according to claim 5, wherein the first resource is located outside a time-frequency resource of an initial BWP.

7. The method according to claim 6, wherein the second information comprises:
   time domain location information and frequency domain location information of the first resource; or
   a relationship between the first resource and a random access resource in the initial BWP.

8. A communication method, wherein the method comprises:
   determining, by an access device, a first bandwidth part (BWP) of an access beam of a terminal device;
   sending, by the access device, first information to the terminal device, wherein the first information indicates a relative amount between the first BWP and a second BWP, and the second BWP is a dedicated BWP configured for the beam; and
   communicating, by the access device, with the terminal device in the first BWP by using the beam.

9. The method according to claim 8, wherein the first information comprises one or more of the following information:
   a scaling factor, or a frequency offset, wherein the scaling factor is a ratio of a bandwidth of the first BWP to a bandwidth of the second BWP, the frequency offset is an offset of a base frequency of the first BWP relative to a reference frequency in frequency domain of the second BWP, the base frequency is any frequency in frequency domain of the first BWP, and the reference frequency is any frequency in the frequency domain of the second BWP.

10. The method according to claim 8, wherein the method further comprises:
    sending, by the access device to the terminal device, location information of a dedicated BWP that is supported by a communication system and that is accessed by the terminal device, wherein the location information indicates a time-frequency resource location of the dedicated BWP, and a quantity of supported dedicated BWPs is any one of 4, 8, 16, 32, or 64.

11. The method according to claim 8, wherein the method further comprises:
    sending, by the access device, indication information to the terminal device, wherein the indication information indicates a polarization manner for communicating on the beam; and
    wherein communicating, by the access device, with the terminal device in the first BWP by using the beam comprises:
       communicating, by the access device, with the terminal device in the first BWP by using the beam in the polarization manner.

12. The method according to claim 8, wherein the method further comprises:
    determining, by the access device, a first resource for random access performed by the terminal device;
    sending, by the access device, second information to the terminal device, wherein the second information indicates the first resource; and
    performing, by the access device, random access to the terminal device by using the first resource.

13. The method according to claim 12, wherein the first resource is located outside a time-frequency resource of an initial BWP.

14. The method according to claim 13, wherein the second information comprises:
    time domain location information and frequency domain location information of the first resource; or
    a relationship between the first resource and a random access resource in the initial BWP.

15. A communication apparatus, comprising at least one processor and a memory coupled to the at least one processor and storing programming instructions for execution by the at least one processor to:
    receive first information from an access device, wherein the first information indicates a relative amount between a first bandwidth part (BWP) and a second BWP of an access beam of the apparatus, and the second BWP is a dedicated BWP configured for the beam;
    determine the first BWP based on the first information and the second BWP; and
    communicate with the access device in the first BWP by using the beam.

16. The apparatus according to claim 15, wherein the first information comprises one or more of the following information:
    a scaling factor, a frequency offset, or a beam number, wherein the scaling factor is a ratio of a bandwidth of the first BWP to a bandwidth of the second BWP, the frequency offset is an offset of a base frequency of the first BWP relative to a reference frequency in frequency domain of the second BWP, the base frequency is any frequency in frequency domain of the first BWP, the reference frequency is any frequency in the frequency domain of the second BWP, and the beam number is indicated by one or more beam numbers associated with the BWPs.

17. The apparatus according to claim 15, wherein the programming instructions are for execution by the at least one processor to:
    receive, from the access device, location information of a dedicated BWP that is supported by a communication system and that is accessed by the apparatus, wherein the location information indicates a time-frequency resource location of the dedicated BWP, and a quantity of supported dedicated BWPs is any one of 4, 8, 16, 32, or 64.

18. The apparatus according to claim 15, wherein the programming instructions are for execution by the at least one processor to:
    receive indication information from the access device, wherein the indication information indicates a polarization manner in which the apparatus communicates on the beam; and
    communicate with the access device in the first BWP by using the beam in the polarization manner.

19. The apparatus according to claim 15, wherein the programming instructions are for execution by the at least one processor to:
    receive second information, wherein the second information indicates a first resource for random access performed by the apparatus;
    determine the first resource based on the second information; and
    perform random access by using the first resource.

20. The apparatus according to claim 19, wherein the first resource is located outside a time-frequency resource of an initial BWP.

* * * * *